United States Patent Office 2,697,014
Patented Dec. 14, 1954

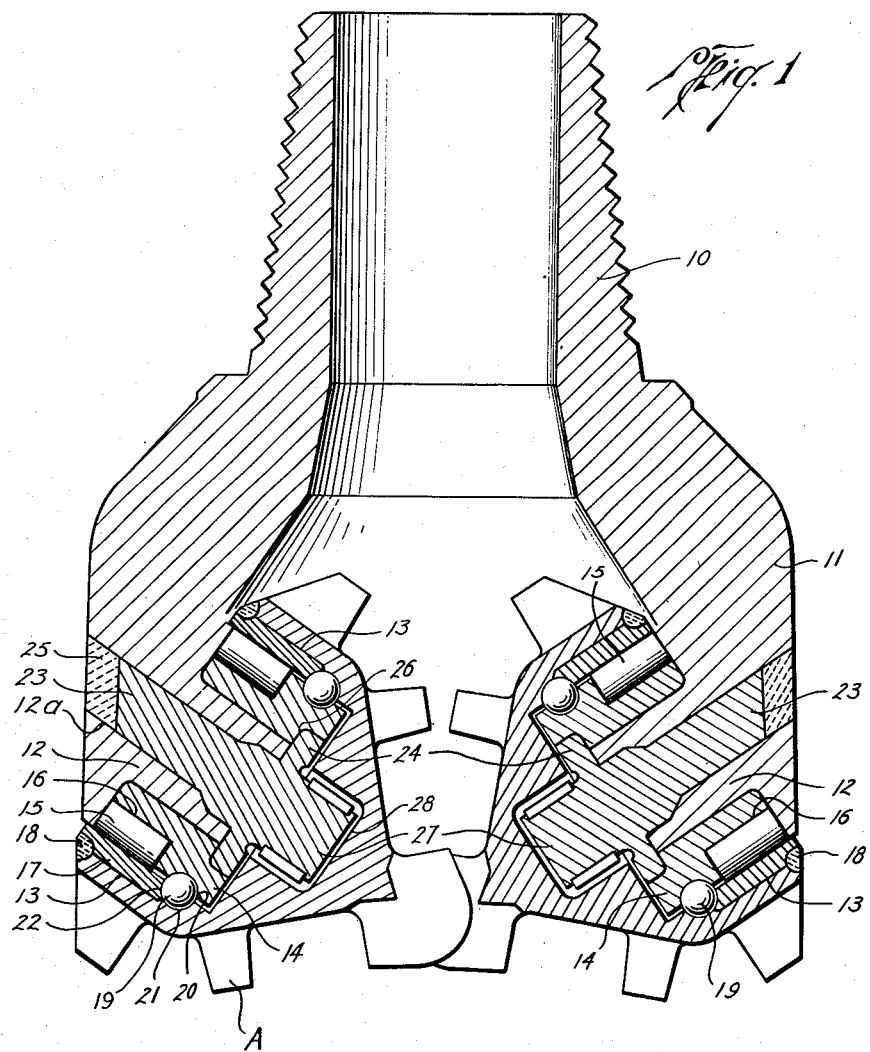

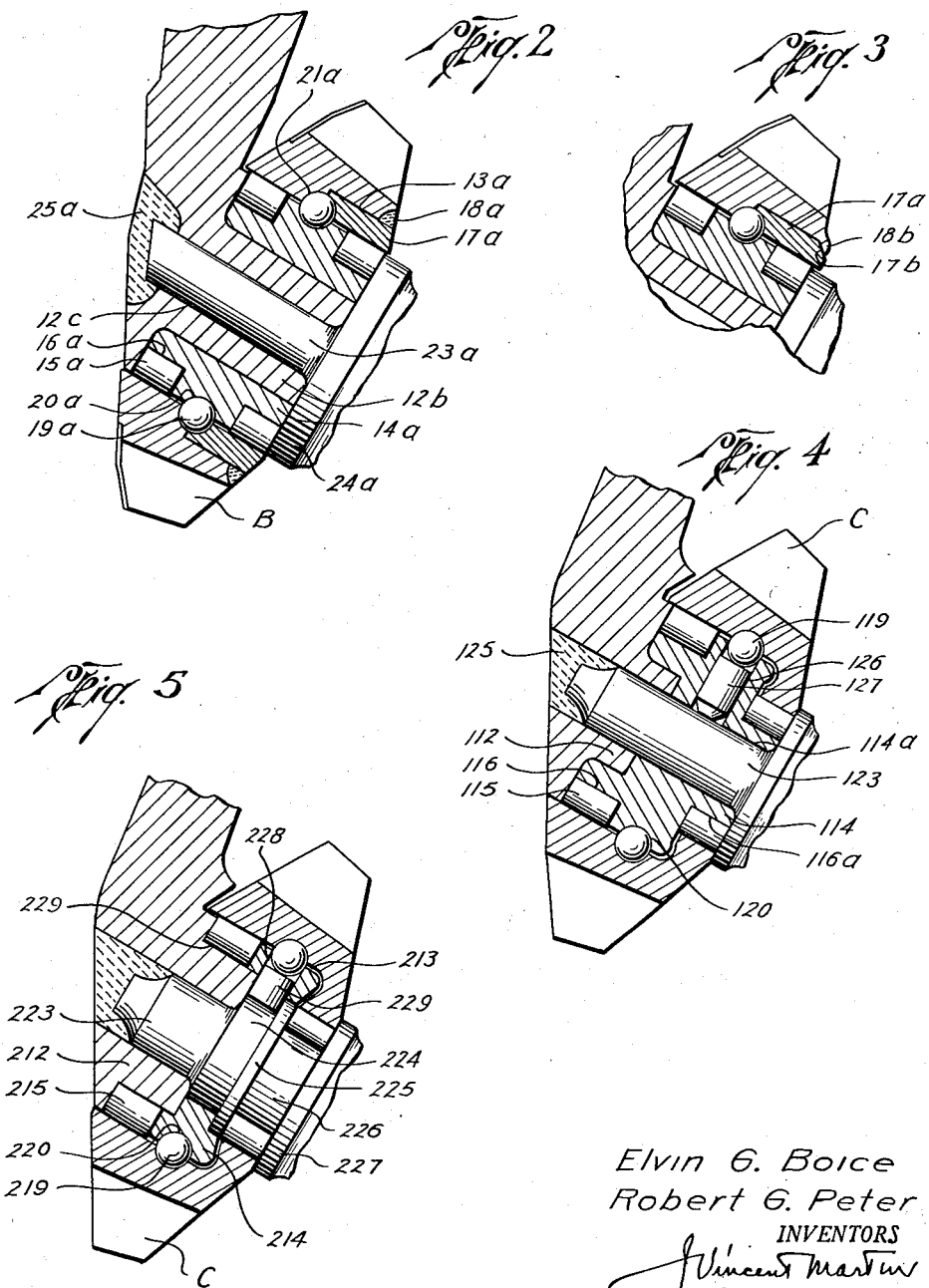

2,697,014

DRILL BIT

Elvin G. Boice and Robert G. Peter, Houston, Tex., assignors to Reed Roller Bit Company, Houston, Tex., a corporation of Texas Application December 24, 1951, Serial No. 263,053

3 Claims. (Cl. 308—8.2)

This invention relates to new and useful improvements in drill bits.

The invention relates particularly to bearing assemblies for rolling type rock bit cutters. Ordinarily, this type of cutter is mounted directly on its spindle with anti-friction bearings disposed between the spindle and the bore of the cutter; because of this construction and in view of the fact that the cutters are only loaded during the drilling operation through the bottom 90° of rotation, excessive spindle raceway wear occurs over the bottom 90° of the spindle.

It is one object of this invention to evenly distribute the load on the entire area of the bearing raceways to prevent uneven wear thereof and thereby prolong the life of the bit.

An important object of the invention is to interpose a rotatable bushing between the spindle and the cutter, which bushing has the bearing raceways therein, whereby during use of the bit said bushing may rotate to present all surfaces of the bearing raceways to the load area, whereby the load is distributed throughout the entire surface of the raceways, and uneven wear of the raceways is obviated.

Another object is to provide a bit of the character described wherein the cutters, together with the raceway bushing, may be quickly and easily assembled on the supporting spindle in substantially the usual manner.

A still further object is to provide an intermediate bushing between the supporting spindle and bore of a roller cutter which is readily applicable to any type of cutter regardless of its particular shape or construction.

Other objects will appear hereinafter.

Figure 1 is a transverse vertical sectional view of a rock bit having cone cutters mounted thereon and illustrating the improved bearing assembly constructed in accordance with the invention, Figure 2 is a sectional detail of a modified form of the invention, Figure 3 is a partial sectional detail illustrating another manner of securing the retaining ring within the cutter shell in the form of the invention shown in Figure 2, Figure 4 is a view similar to Figure 2 of still another form of the invention, and Figure 5 is a view similar to Figures 2 and 4 showing another modification.

In the drawings the numeral 10 designates a bit body having depending supporting legs 11 which are disposed diametrically opposite each other. Each leg has an inwardly directed inclined spindle 12 for supporting one of the cutters A; the cutters shown in Figure 1 are the usual rolling type of cone cutters and the cutter shell is formed with a recess or bore 13 which engages over the spindle, as will be hereinafter explained.

In carrying out the present invention an annular bushing or sleeve 14 surrounds the spindle with a slight interference fit; it has been found that the fit of the bushing on the spindle should not exceed approximately .002 inch interference. Roller bearings 15 engage external raceways 16 formed in the bushing 14 and also engage a ring 17 which is welded at 18 within the bore 13 of the cutter. Ball bearings 19 engage a raceway 20 in the bushing or sleeve 14 and also engage a recess 21 in the bore of the cutter and a recess 22 in the end of the ring 17. A spindle pin 23 having a flange 24 is welded at 25 within the bore 12a of the spindle and as is clearly shown in Figure 1 the flange 24 overlies the end of the spindle and also engages an annular recess 26 formed in the bushing 14.

The spindle pin has an extension 27 which is disposed within a counterbore 28 provided in the cutter A.

It will be evident that the raceways 16 and 20 in the external surface of the bushing or sleeve 14 are engaged by the roller bearings 15 and ball bearings 19. As the cutter rotates during operation of the bit the load area may be said to be the bottom 90° of the bearing raceways.

Because of the slight interference fit of the bushing or sleeve 14 on the spindle 12, the bushing may undergo rotation during use of the bit. Such rotation will constantly present different surfaces of the raceways 16 and 20 to the load area, and it is therefore evident that all surfaces of the raceways will be utilized to prevent excessive wear of any particular area of such raceways.

In assembling the cutter A upon the spindle the spindle pin 23 is first placed with its extension 27 within the counterbore 28 of the cutter. The ball bearings 21 are then engaged with the raceway 20 of the bushing or sleeve 14 and said bushing, together with the ball bearings, are inserted within the bore 13 of the cutter until the flange 24 of the spindle pin is engaged within the recess 26 of the bushing. Thereafter the assembly ring 17 is inserted within the bore 13 of the cutter and is welded at 18 to retain the bushing 14 and spindle pin within the cutter. Thereafter the roller bearings 15 are inserted into the raceways 16 and then the complete assembly is engaged with the spindle 12, the bushing or sleeve 14 sliding over the exterior thereof and the spindle pin moving inwardly of the bore of said spindle. By means of the welding 25 the cutter is thereby mounted on the spindle and is rotatable on the bearings 15 and 19.

In Figure 2 the invention is illustrated as applied to a rolling side cutter B of a drill bit. In this instance the spindle 12b of the bit has a bore 12c. A raceway bushing or sleeve 14a has a slight interference fit over the spindle and its external surface is formed with roller bearing raceways 16a and a ball bearing raceway 20a. The bore 13a of the cutter B is adapted to receive an assembly retaining ring 17a which is welded thereto at 18a. A spindle or bridge pin 23a having a flange 24a is insertable within the bore of the spindle and is welded thereto at 25a. It will be evident that upon rotation of the cutter B the sleeve or bushing 14a may undergo rotation on the spindle to constantly present different surfaces of the raceways 16a and 20a to the load area.

In the assembly of the modification shown in Figure 2 the balls 19a are inserted within the raceways 20a of the bushing 14a and the parts are introduced into the bore of the cutter so that said balls engage the cutter raceways 21a. Thereafter the assembly ring 17a is welded within the bore of the cutter, and this secures the bushing or sleeve 14a within the cutter. Thereafter the roller bearings 15a are inserted to engage the raceways 16a and the assembly is placed over the spindle 12b. The spindle or bridge pin 23a is then inserted and the flange 24a thereof engages the end of the bushing and the roller bearings 15a to retain the same in position.

It may not be desirable to subject the assembly ring 17a to the heat of welding and in Figure 3 an arrangement is shown wherein the retaining or assembly ring 17a is modified to the extent of being provided with a beveled portion 17b at its outer end. A portion 18b of the cutter shell is deformed by rolling, peening or otherwise, over the beveled end 17b and functions to retain the assembly ring 17a in position. In this manner the ring is properly secured without the necessity of welding the same. It is evident that this method of securing the assembly ring within the cutter shell is also applicable to the retaining ring 17 of the first form shown in Figure 1; in such instance, a portion of the cutter shell will be deformed over the end of the ring 17, being substituted for the welding material 18.

In Figure 4 another form of the invention is shown wherein the ball bearings may be inserted after the cutter is mounted on the spindle. In this form the bit is provided with a spindle 112, which spindle is relatively short. A spindle pin 123 is insertable within the bore of the spindle and may be welded therein by welding 125. A bushing or sleeve 114 having an inner roller bearing raceway 116 and an outer roller bearing raceway 116a is adapted to encircle the spindle pin 123. The central portion of the bushing or sleeve has a ball bearing raceway 120 and this raceway communicates with the bore 114a of the bushing through a radial opening 126.

In this form of the invention the roller bearings 115 and the bushing 114 are assembled within the cutter C. Thereafter, ball bearings 119 are inserted into the raceway 120 through the radial opening 126 and after all of the balls are in position a retaining pin 127 is inserted within said opening. The spindle pin 123 is then disposed within the bore 114a of the bushing and functions to retain the balls within the raceway. As in the other forms of the invention the bushing or sleeve 114 may undergo rotation with respect to the spindle to constantly present different raceway surfaces to the load area.

Still another form of the invention is illustrated in Figure 5, wherein the bit is provided with a spindle 212. A spindle pin 223 has an enlarged portion 224 beyond which is a flange 225. Beyond the flange is a cylindrical portion 226 and an outer flange 227. A bushing 214 surrounds the cylindrical portion 224 and the flange 225 and is insertable within the bore 213 of a cutter C. This bushing has a raceway 220 for receiving bearings 219. The ball bearings are insertable through a radial opening 228 formed in the bushing 214 and are retained therein by a retaining pin 229. In this form roller bearings 215 engage raceways 229 formed on the spindle 212 and the rotatable bushing 214 is provided only with ball bearing raceways. Obviously, during operation of the bit, the bushing 214 may rotate to evenly distribute wear to the ball bearing raceway 220.

In all forms of the invention the bushing is interposed between the supporting spindle and the bore of the cutter, and said bushing is mounted so that it may undergo rotation during the drilling operation. In this manner the entire surface of the bearing raceways are presented to the load area and an uneven excessive wear on any portion of said raceways is obviated.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, we claim:

1. A drill bit including a bit body having a cutter spindle provided with an axial bore, a bushing rotatably mounted on the spindle, a cutter rotatably mounted on the bushing, a spindle pin engageable within the bore of the spindle and having means coacting with the bushing and cutter for retaining these parts in position on the spindle, ball bearings disposed between the exterior of the bushing and the bore of the cutter and an annular retaining ring secured within the bore of the cutter and engageable with the ball bearings to retain the latter in position.

2. A drill bit including, a bit body having a cutter spindle formed with an axial opening, a cutter assembly including a cutter having a bore, a bushing within the bore of said cutter, ball bearings between the exterior of the bushing and the cutter, an annular retaining element secured within the bore of the cutter engageable with the ball bearings for retaining the same in position, the bushing being engageable upon the spindle and rotatable with respect thereto, said cutter being rotatable with respect to both the bushing and the spindle, and a flanged spindle pin engageable within and secured in the bore of the spindle with its flange coacting with the bushing and cutter to retain the cutter assembly in position on the spindle.

3. A drill bit including, a bit body having a cutter spindle formed with an axial opening, a cutter assembly including a cutter having a bore, a bushing within the bore of said cutter, ball bearings between the exterior of the bushing and the cutter, an annular retaining element secured within the bore of the cutter engageable with the ball bearings for retaining the same in position, the bushing being engageable upon the spindle and rotatable with respect thereto, said cutter being rotatable with respect to both the bushing and the spindle, a flanged spindle pin engageable within and secured in the bore of the spindle with its flange coacting with the bushing and cutter to retain the cutter assembly in position on the spindle, and roller bearings disposed between the exterior of the bushing and the bore of the retaining ring.

References Cited in the file of this patent

UNITED STATES PATENTS

| Number | Name | Date |
|---|---|---|
| 1,200,445 | Laycock | Oct. 3, 1916 |
| 1,940,839 | Behnke | Dec. 26, 1933 |
| 2,091,889 | Scott et al. | Aug. 13, 1937 |
| 2,171,057 | Crum | Aug. 29, 1939 |
| 2,351,357 | Miller et al. | June 13, 1944 |